Feb. 4, 1958 F. H. JONES 2,822,144
CLAMP
Filed July 27, 1953
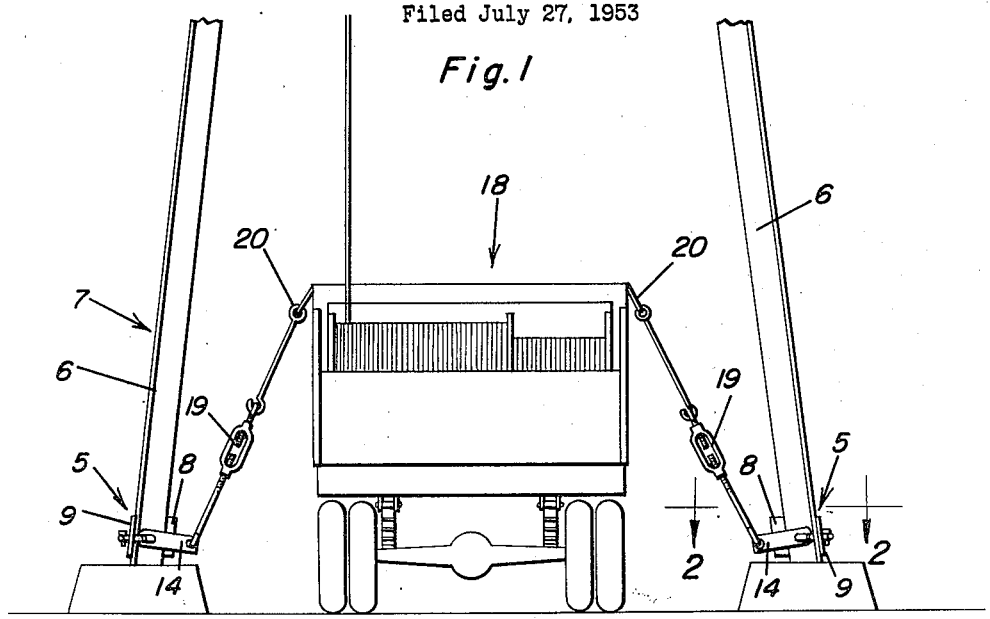
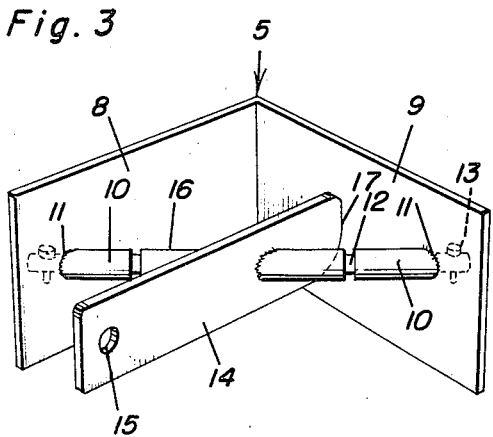
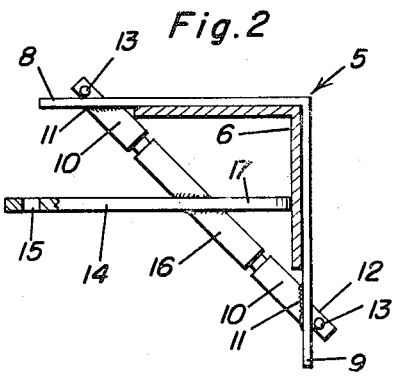
Frank H. Jones
INVENTOR.

United States Patent Office 2,822,144
Patented Feb. 4, 1958

2,822,144

CLAMP

Frank H. Jones, Sulphur Bluff, Tex.

Application July 27, 1953, Serial No. 370,349

1 Claim. (Cl. 248—361)

The present invention relates to new and useful improvements in clamps for use particularly in oil fields and has for its primary object to provide, in a manner hereinafter set forth, a device of this character comprising novel means for anchoring drilling machines or work over units in position relative to derricks of the type comprising angle iron legs.

Another very important object of the invention is to provide an anchoring clamp of the aforementioned character which is adapted to be expeditiously applied to the derrick leg without the use of screws, bolts or other extraneous securing means.

Still another important object of the invention is to provide an anchoring clamp of the character described embodying a unique construction and arrangement whereby the grip of said clamp on the derrick leg will be increased as the pull or strain on the device is increased.

Other objects of the invention are to provide an anchoring clamp of the character set forth which will be comparatively simple in construction, strong, durable, highly efficient and reliable in use, compact, light in weight, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is an elevational view, showing a plurality of clamps constructed in accordance with the present invention in use;

Figure 2 is a view in horizontal section, taken substantially on the line 2—2 of Figure 1; and, Figure 3 is a perspective view of the clamp.

Referring now to the drawing in detail, it will be seen that the embodiment of the invention which has been illustrated comprises a metallic angle member 5 which is adapted to fit on the outer sides of the angle iron legs 6 of a conventional derrick 7. As shown to advantage in Figure 2 of the drawing, the legs 8 and 9 of the angle member 5 are of a length to project beyond the free or outer longitudinal edges of the flanges of the derrick leg 6.

Mounted diagonally in openings which are provided therefore in the projecting end portions of the legs 8 and 9 of the angle member 5 is a pair of aligned tubular bearings 10. The bearings 10 are fixed to the portions 8 and 9 of the angle member 5 by welding, as at 11.

Mounted in the bearings 10 and projecting beyond the legs 8 and 9 of the angle member 5 is a shaft 12. The projecting end portions of the shaft 12 are apertured for the reception of retaining pins 13.

Mounted for swinging movement on the shaft 12 is a lever 14 having an opening 15 in its free end portion. Extending diagonally through the other end portion of the lever 14 and fixed therein as by welding is a sleeve 16 which is journaled on the shaft 12 between the bearings 10. Formed integrally with this pivoted end of the lever 14 is a cam jaw 17 which is cooperable with the member 9 for clamping one of the flanges of the derrick leg 6 therebetween. It will thus be seen that the members 9 and 17 constitute what may be considered opposed, coacting, stationary and pivoted jaws.

It is thought that the manner in which the device functions will be readily apparent from a consideration of the foregoing. In Figure 1 of the drawing, a conventional mobile drilling machine is indicated by reference character 18, which machine is positioned for operation between the derrick legs 6. The members 5 are positioned on the derrick legs 6 and the shafts 12 are inserted through the bearings 10 and the sleeve 16 and secured through the medium of the pins 13. Turnbuckles 19 have one end anchored to the machine, as at 20, and their other ends connected to the levers 14 through the openings 15. The turnbuckles 19 are then tightened for anchoring the machine 18 in position. As the turnbuckles 19 are thus tightened, the levers 14 are swung upwardly for clamping the derrick legs between the jaws 9 and 17 in an obvious manner. Pivoted cam jaw 17 is shaped to prevent swinging movement beyond dead center.

It is believed that the many advantages of an anchoring clamp constructed in accordance with the present invention will be readily understood and although a preferred embodiment of the device is as illustrated and described, it is to be understood that changes in details of construction may be resorted to which will fall within the scope of the invention as claimed.

What is claimed as new is as follows:

Means for anchoring a drilling machine to an angle iron leg of an oil well derrick comprising; a metallic angle member mounted exteriorly on the leg and projecting beyond the edges thereof, aligned tubular bearings fixed diagonally on the inner sides of the projecting end portions of said angle member adjacent the edges of the leg, a shaft journaled in said bearings and terminating in apertured end portions projecting through and beyond the angle member, removable retaining pins in said end portions of said shaft, a sleeve journaled on the shaft, a lever cam fixed diagonally at an intermediate point on the sleeve, said lever cam paralleling one of the flanges of the derrick leg and being engageable at one end with the other flange thereof at right angles thereto for frictionally clamping the angle member thereon, and means including a turnbuckle for connecting the other end of the lever cam to the machine.

References Cited in the file of this patent

UNITED STATES PATENTS

| 437,200 | Hess | Sept. 30, 1890 |
| 843,009 | Good | Feb. 5, 1907 |
| 1,202,912 | Souther | Oct. 31, 1916 |
| 1,831,416 | Junkers | Nov. 10, 1931 |
| 2,532,209 | Wallace | Nov. 28, 1950 |
| 2,568,263 | Wiseman | Sept. 18, 1951 |
| 2,584,902 | Miller | Feb. 5, 1952 |
| 2,655,874 | Swann | Oct. 20, 1953 |